Patented Feb. 10, 1953

2,628,255

UNITED STATES PATENT OFFICE 2,628,255

PRODUCTION OF ARYLACETALDEHYDES

Arthur R. Sexton and Edgar C. Britton, Midland, Mich., assignors to The Dow Chemical Company, Midland, Mich., a corporation of Delaware No Drawing. Application January 2, 1951, Serial No. 204,081

4 Claims. (Cl. 260—599)

This invention concerns an improved method for the isomerization of monoaryl-ethylene oxides to form arylacetaldehydes. It pertains especially to the isomerization of styrene oxide (also known as 1,2-epoxyethylbenzene) to produce phenylacetaldehyde.

It is known that many olefine oxides, particularly aliphatic olefine oxides such as ethylene oxide or propylene oxide, may be isomerized by heating the same together with any of a variety of catalyst, e. g. acids, alkalies, salts, or surface active catalysts such as bleaching earths, aluminum oxide, etc., to obtain corresponding aldehydes as principal products. By-products such as ketones, unsaturated alcohols, polymers of the olefine oxides, or decomposition products of the olefine oxides are often formed and may be obtained in considerable amount, or even in major amount, depending on the reaction conditions, e. g. the kinds of olefine oxide and catalyst and the reaction temperatures, etc., employed. Tiffeneau, Ann. Chim. Phys. (8) 10 322–378 (1907), and Tiffeneau et al., Compte rend. 146 697–699 (1908) report that styrene oxide is surprisingly resistant to isomerization under conditions which cause ready isomerization of other olefine oxides to form aldehydes.

It is an object of this invention to provide an improved method, and certain catalysts, which permit ready isomerization of styrene oxide, and other monoaryl-ethylene oxides, to form corresponding monoarylacetaldehydes in good yield. Other objects will be evident from the following description of the invention.

We have found that the monoaryl-ethylene oxides having the general formula:

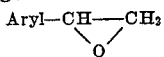

wherein aryl represents a monovalent aromatic hydrocarbon radical of the benzene series having its single valence on a carbon atom of the benzene nucleus, may readily be isomerized by passing vapors of the same into contact with a synthetic magnesium silicate at reaction temperatures of from 200° to 400° C. Examples of mono-aryl-ethylene oxides having the above formula are styrene oxide, ar-methyl-styrene oxide, ar-dimethyl-styrene oxide, ar-ethyl-styrene oxide, and ar-isopropyl-styrene oxide, etc. The magnesium silicate is highly effective as a catalyst in isomerizing such aryl-ethylene oxides to form corresponding monoaryl-acetaldehydes.

The synthetic magnesium silicates are known materials which are made by wet methods of precipitation. They are obtainable as fine particles of sizes ranging from one micron to those just capable of passing through a standard 325 mesh sieve. One such magnesium silicate is marketed under the name of Magnesol.

Prior to use in the process, the finely divided magnesium silicate is pressed into pellets of sizes convenient for use as a catalyst, e. g. to form tablets or pellets of from 1/16 to 1/4 inch thickness or diameter. Usually, from 1 to 4 per cent by weight of a binder such as graphite or mineral oil, etc., is mixed with the finely divided magnesium silicate to aid in forming the pellets. If desired, such binder may thereafter be removed from the pellets in usual ways, e. g. by vaporization or by oxidation with air, oxygen, or preferably a mixture of steam and air. However, graphite does not interfere seriously with the action of the catalyst and, when used in forming the pellets, need not be removed.

In practice, the monoaryl-ethylene oxide is heated to vaporize the same and the vapors are passed through a bed of the magnesium silicate catalyst at reaction temperatures in the order of from 200° to 400° C., preferably from 225° to 350° C. The reaction is usually carried out at atmospheric pressure, or thereabout, and without addition of gaseous or vaporized diluents to the mixture. However, it may be carried out at sub-atmospheric or at pressures somewhat above atmospheric and in the presence or absence of inert diluents such as steam or nitrogen. There are instances in which a vacuum may advantageously be applied, or such gaseous diluents be introduced, or both, to aid in vaporizing the aryl-ethylene oxide reactants without heating them to temperatures higher than stated above.

The vapors flowing from the bed of catalyst are cooled to condense the arylacetaldehyde product and any unreacted aryl-ethylene oxide. The arylacetaldehyde may be separated and purified by fractional distillation. The recovered aryl-ethylene oxide, if any, may be re-employed in the process.

The method, as just described, may be applied in isomerizing any monoaryl-ethylene oxide, having the aforementioned general formula, to produce a corresponding aryl-acetaldehyde in good yield. For instance, it may be applied in isomerizing styrene oxide to obtain phenylacetaldehyde, in isomerizing an ar-methyl-styrene oxide to produce an ar-methylphenyl-acetaldehyde, in isomerizing an ar-dimethyl-styrene oxide to obtain an ar-dimethylphenylacetaldehyde, or in isomerizing an ar-ethyl-styrene oxide to form an ar-ethylphenylacetaldehyde, etc.

The following examples describe certain ways for practice of the invention, but are not to be construed as limiting its scope.

*Example 1*

A tubular catalyst chamber of 4 inches internal diameter was charged with 2.5 liters of pellets of Magnesol, a synthetic hydrated magnesium silicate having a composition corresponding approximately to the empirical formula $$MgO \cdot 2.5SiO_2 \cdot H_2O$$

The pellets were in the form of tablets of about $\frac{3}{16}$ inch thickness and $\frac{1}{4}$ inch diameter. Styrene oxide was vaporized and the vapors were passed through an externally heated tube, where they were heated to temperatures in the order of from 200° to 225° C., and thence into the catalyst chamber. During passage of the vapors through the chamber, and the bed of Magnesol therein, the catalyst chamber was heated externally to bring the materials therein to temperatures in the order of from 350° to 400° C. Vapors flowing from the chamber were cooled to condense and collect the product. Operation in this manner was continued for 75 hours, during which time styrene oxide was fed to the reaction at a rate of 2.5 pounds per hour. The product which was collected contained 199 pounds of monophenylacetaldehyde. The yield of phenylacetaldehyde was 90 per cent of theoretical, based on the styrene oxide starting material.

*Example 2*

Styrene oxide was vaporized by heating the same to boiling under vacuum. The vapors were passed under vacuum, i. e. at about 100 millimeters absolute pressure, through a bed of hydrated magnesium silicate pellets, similar to those employed in Example 1, while externally heating the bed to bring the vapors flowing through the same to a temperature of about 250° C. The effluent vapors were cooled to condense and collect the product. A total of 1052 grams of styrene oxide was fed to the reaction in 4 hours. The product, which was collected over the 4 hour period, contained 845 grams of phenylacetaldehyde. The yield of the latter was about 80 per cent of theoretical, based on the styrene oxide starting material.

*Example 3*

The experiment of Example 1 is repeated, except that para-methyl-styrene oxide, instead of styrene oxide, is fed to the reaction. Paramethylphenylacetaldehyde is obtained as the principal product.

Other modes of applying the principle of the invention may be employed instead of those explained, change being made as regards the method herein disclosed, provided the step or steps stated by any of the following claims or the equivalent of such stated step or steps be employed.

We claim:

1. A method for the production of a monoarylacetaldehyde which comprises passing vapors of a monoarylethylene oxide, having the general formula:

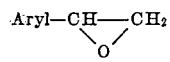

wherein aryl represents a monovalent aromatic hydrocarbon radical of the benzene series, into contact with a magnesium silicate catalyst at a reaction temperature between 200° and 400° C.

2. A method, as described in claim 1, wherein the vapors of the monoaryl-ethylene oxide are passed through a bed of the magnesium silicate catalyst at reaction temperatures between 200° and 400° C. and the vapors flowing from the bed are cooled to condense the monoarylacetaldehyde product.

3. A method, as described in claim 1, wherein the monoaryl-ethylene oxide is monophenyl-ethylene oxide and the monoarylacetaldehyde is monophenylacetaldehyde.

4. A method, as described in claim 2, wherein the monoaryl-ethylene oxide is monophenyl-ethylene oxide and the monoarylacetaldehyde is monophenylacetaldehyde.

ARTHUR R. SEXTON.
EDGAR C. BRITTON.

REFERENCES CITED

The following references are of record in the file of this patent:

UNITED STATES PATENTS

| Number | Name | Date |
|---|---|---|
| 1,906,833 | Baur | May 2, 1933 |

FOREIGN PATENTS

| Number | Country | Date |
|---|---|---|
| 331,185 | Great Britain | June 18, 1930 |
| 763,914 | France | May 9, 1934 |

OTHER REFERENCES

Tiffeneau et al., "Compte Rendu," vol. 146 (1908), pages 697–98.

Richter's Organic Chemistry (Elsevier Publ. Co. 1946), vol. III, page 399.